United States Patent Office 2,905,528
Patented Sept. 22, 1959

2,905,528

METHOD FOR PREPARATION OF $UO_2$ PARTICLES

James R. Johnson, White Bear, Minn., and Albert J. Taylor, Oak Ridge, Tenn., assignors to the United States of America as represented by the United States Atomic Energy Commission No Drawing. Application February 24, 1958
Serial No. 717,281

5 Claims. (Cl. 23—14.5)

Our invention relates to methods for the preparation of fuel for nuclear reactors, and more particularly to a method for the preparation of $UO_2$ particles of a size, shape, and chemical inertness suitable for use in reactor fuel elements.

In one method of preparing fuel elements for nuclear reactors $UO_2$ particles in a selected size range are mixed with a diluent material, the resulting mixture is loaded into a die cavity and pressed, and the resulting pressed member is completely jacketed with a corrosion-resistant material. The jacketing or cladding may be accomplished by hot-rolling the core-compact between plates of a cladding material in such a manner as to form a metallurgically-bonded sandwich. A more detailed description of the manner of preparing fuel plates and fuel elements which may be made from such fuel plates may be found in the Proceedings of the International Conference on the Peaceful Uses of Atomic Energy, vol. 9, p. 203, MTR Type Fuel Elements.

When fuel element cores are formed from a mixture of $UO_2$ particles and a metal diluent powder, difficulties arise during fabrication from (1) reaction of the metal diluent with the $UO_2$ at the high temperatures required, and (2) mechanical crushing of the $UO_2$ particles during the hot-rolling process. Further difficulty arises when the fuel element is in a reactor in that damage to the matrix is caused by fission fragments. The size of the $UO_2$ particles determines the relative number of fission recoil fragments that escape from said particles and enter the matrix body structure. The damage to the matrix caused by the fission products and the reactivity of the $UO_2$ increase with increasing $UO_2$ surface area, and for that reason it appears desirable to use $UO_2$ of a large particle size. However, as the $UO_2$ particles increase in size, more of them are crushed during the fabrication operations, thus increasing the amount of $UO_2$ in the form of the particles.

The $UO_2$ particles should be large enough to minimize reaction with the surrounding metal during fabrication and minimize fission product damage to the matrix, and yet be small enough to keep the crushing of particles to a minimum. It has been determined that the optimum size of $UO_2$ particles to be used in a matrix-type fuel element are those particles having a diameter of from approximately 40 microns to approximately 100 microns.

One prior art method of making $UO_2$ particles of the required size comprised fusing $UO_2$ particles in an electric arc, crushing and grinding the resultant solid mass of $UO_2$, and then screening the resulting particles to segregate the particles within the desired size range. This process has the following disadvantages: (1) arc melting is an expensive process; (2) there are high losses of $UO_2$ in the arc melting process; (3) all the fused $UO_2$ must be crushed and screened; (4) the crushing step contaminates the $UO_2$ particles with iron; (5) the starting material for the arc-melting process is $UO_2$, so the arc-melting process includes all the steps necessary to the formation of $UO_2$; and (6) in crushing large particles many plate-like particles are formed, which are not of the desired shape.

In another prior art method for making $UO_2$ particles of the desired size, sintering is used to agglomerate $UO_2$ powders and the sintered $UO_2$ is crushed and screened. This process, however, has some of the same disadvantages as the fusing process, plus the additional disadvantages that the $UO_2$ particles produced are not as dense, nor as inert, nor do they have as low a surface area as the particles produced by fusing.

The principal disadvantage of the prior art methods is that they provide no control of particle shape. Ordinarily material which has been arc-fused, or compacted and sintered to high density will undergo conchoidal fracture when crushed, thus producing many flaky fragments or fragments with many thin edges and sharply pointed corners. Particles of this type tend to defeat the purpose of making large, dense, bulky, single particles with a low surface to volume ratio. Thin edges and points tend to fracture off in fuel element fabrication thus creating many fine particles; thin edges and sharp points, even if they have not broken off of the main particle in fabrication, present spots where reactions are most likely to begin, and thin edges and sharp points, with their one very small dimension, present, in some degree, the disadvantage of increased fission fragment damage to the matrix material.

One object of our invention is to provide a method for producing $UO_2$ particles having a high percentage of said particles within the desired particle size range.

Another object is to produce $UO_2$ particles having a low surface to volume ratio.

Still another object is to produce $UO_2$ particles having the physical strength to withstand rolling operations with a minimum of shattering.

Still another object is to produce $UO_2$ particles having a minimum chemical reactivity.

Yet another object is to produce $UO_2$ particles having a high density.

Additional objects will become apparent from the following detailed description and the claims appended thereto.

In accordance with our invention, $UO_2$ particles of the desired physical properties may be made by contacting $UO_3$ with an aqueous solution of uranyl ions at an elevated temperature, whereby $UO_3$ hydrate crystals are formed, separating the resulting $UO_3$ hydrate crystals from the mother liquor, washing the separated crystals with water, reducing the washed crystals to $UO_2$, densifying said $UO_2$ and recovering the resulting densified $UO_2$ particles within the desired particle size range.

We have found that when the $UO_2$ particles are made in accordance with our invention, a higher percent are in the desired particle size range than particles made by prior art methods, and most have the desired shape, which approaches that of a sphere, yet the density of the particles is as high as the denstiy of the particles formed in the prior art from the fused oxide. Particles of $UO_2$ made by our process have been successfully used in fuel elements of nuclear reactors of the type described in the book published by the Atomic Energy Commission, "Material Testing Reactor Project Handbook" and identified at TID–7001.

In the first step of our process $UO_3$ particles are contacted at an elevated temperature in a closed vessel with an aqueous solution of uranyl ions. The $UO_3$ may be furnished as $UO_3$ crystals or may be formed in situ by the decomposition of a higher uranium oxide at the elevated temperature. In the preferred method of carrying out our invention $UO_4$ hydrate, which decomposes to $UO_3$, water and oxygen at elevated temperatures, is used to furnish the $UO_3$.

The uranyl ions in the aqueous solution may be furnished in the form of any uranyl salt which will supply a suitably high concentration of uranyl ions. We have found aqueous solutions of uranyl nitrate or uranyl acetate to be particularly suitable and uranyl nitrate is preferred. The concentration of the aqueous solution of uranyl ions is not critical, and we have found concentrations in the range of from 0.9 percent to 20 percent by weight to be suitable. A sufficient quantity of the aqueous solution is added to increase the uranium weight by from approximately 0.2 to 10 percent over the amount in the $UO_3$.

As a procedure alternative to adding an aqueous solution of uranyl ions to the uranium oxide particles, an aqueous solution of an acid may be added to said particles to form the uranyl ions. When this alternative procedure is used nitric acid is the preferred form of the acid. Sufficient acid should be added to dissolve approximately 10 to 18 percent of the uranium oxide particles. In either procedure sufficient water should be provided so that all the solid material will be bathed with solution.

The resulting mixture is then heated in a closed vessel whereby $UO_3$ crystals are grown. The operative temperature range is from approximately 250° C. to approximately 350° C. and we have found that the optimum temperature is approximately 265° C. Temperatures lower than approximately 250° C. result in incomplete processing, and undesirable crystal forms are produced at temperatures higher than 350° C. While the mixture may be held at the reaction temperature for from approximately 5 hours to over approximately 20 hours, the preferred processing time is approximately 10 hours. The control of time and temperature is important. Less than five hours' reaction time results in incomplete processing. There is generally no advantage in reacting for over 20 hours, and reaction times of over 20 hours may prove detrimental due to formation of large unstable crystals.

The apparatus used may be any equipment which will withstand the operating temperatures and the vapor pressures which correspond to those temperatures. Any corrosion-resistant material may be used, and a typically satisfactory material is stainless steel.

The grown crystals are allowed to cool. The temperature to which the crystals are cooled is not critical, and we have found suitable product to be obtained when the crystals are cooled to room temperature. The cooled crystals are waterwashed to remove any uranyl salt. The washing should be done immediately after cooling so that the crystals do not agglomerate, and may be accomplished by pouring water over the crystals, draining the crystals, and repeating several times. The temperature of the wash-water is not critical but it is preferred that it be at approximately room temperature. Since $UO_3$ crystals are sparingly soluble in water, the quantity of wash-water used is not critical and the crystals should be washed until they are free of uranyl ions. Rough handling of the crystals during washing should be avoided because such handling will break some crystals thereby producing plate-shaped particles.

The washed $UO_3$ hydrate crystals are then reduced to $UO_2$ and densified. The reduction to $UO_2$ and subsequent densification is accomplished by heating the $UO_3$ hydrate crystals until a temperature over approximately 1000° C. is reached. The reduction takes place around 500° C. to 600° C. in a reducing atmosphere and densification is accomplished by heating the resulting $UO_2$ particles in an inert or a reducing atmosphere until a temperature above approximately 1000° C. is reached and maintaining the particles above that temperature for a period of time. Densification by heating to 1000° C. is satisfactory, but a harder, more dense product is obtained by heating to a higher temperature. Although temperatures up to the melting point of $UO_2$ could be used, no increase in density occurs by heating above approximately 1800° C., and we prefer to carry out the densification at approximately that temperature.

In the preferred manner of forming the densified $UO_2$ particles from the $UO_3$ hydrate crystals, the washed $UO_3$ hydrate crystals are placed in an oven and heated slowly in an inert or a reducing atmosphere at a temperature of approximately 100° C. until the crystals are dry. The dried crystals are then placed in a furnace and slowly heated in an inert atmosphere to a temperature of approximately 600° C. If a reductant is present during this stage there is a safety hazard due to rapid reaction between the reductant and $O_2$ evolved from $UO_3$. Inasmuch as rapid heating of the $UO_3$ hydrate crystals will cause some of them to break, the rate of heating should closely controlled. We have found that a period of two hours to bring the crystals to the reduction temperature is adequate to prevent crystal shattering. The heated crystals are then exposed to a reducing atmosphere, preferably gaseous hydrogen, and are further heated to the temperature at which densification is to be carried out, approximately 1800° C. We have found that at the preferred temperature of 1800° C., the densification is substantially complete in from 1 to 2 hours.

After reduction and densification, the product is cooled and is then screened to separate desired particles in the size range of 40–100 microns. The larger particles may be crushed or ground and the product screened. However, the amount by which the useful $UO_2$ may be increased by crushing and grinding is limited because severe crushing and grinding of the $UO_2$ crystals may produce sufficient fines to coat the larger particles, apparently making their surfaces more reactive. The crushing grinding may be carried out in conventional crushing and grinding equipment.

The following examples illustrate our invention in greater detail.

*Example 1*

To 2200 grams of $UO_4$ hydrate cake containing 983.4 grams of uranium and 745.8 grams of free water was added 173.1 grams of uranyl nitrate containing 37 grams of free water and 83.6 grams of uranium. To this mixture was added 610 grams of water to bring the total weight of free water in the mixture to 1393 grams. The mixture was placed in an autoclave and digested for 12.3 hours at 250° C. The mixture was then cooled to room temperature and removed from the autoclave. The mother liquor was poured off and the crystals were immediately washed until free of uranyl ions. The washed crystals were dried in an oven at 100° C. and then placed in a furnace in a hydrogen atmosphere and the temperature of the furnace was slowly increased to 1750° C. It took two days for the furnace to attain that temperature and the temperature was maintained for two hours. The temperature was reduced to room temperature over a period of 2 days. The cooled crystals of $UO_2$ were then removed from the furnace. The sieve analysis of the crystals was as follows:

| Size (microns) | Weight (grams) | Percent of Total |
|---|---|---|
| +589 | 22 | 1.96 |
| +295 to −589 | 86 | 7.65 |
| +145 to −295 | 567 | 50.44 |
| +104 to −147 | 243 | 21.62 |
| +61 to −104 | 149 | 13.26 |
| +43 to −61 | 36 | 3.20 |
| −43 | 21 | 1.87 |
| Total | 1,124 | 100.00 |

The crystals smaller than 43 microns were not useable nor were the crystals above 589 microns. The crystals in the size range between 104 microns and 589 microns were crushed to within the 43 to 104 micron range. The usable weight of crystals was 1081 grams or 96.2% of the total weight of product.

Example II

To 3333 grams of $UO_4$ hydrate containing 1140 grams of uranium and 1350 grams of free water was added 100 cc. concentrated nitric acid containing 30 grams of free water. To this mixture was added 1340 grams of water bringing the total free water to 2720 ccs. 140 grams of the uranium contained in the $UO_4$ hydrate was thus converted to uranyl nitrate at autoclaving temperatures according to the equation:

$$3(UO_4 \cdot 6.2H_2O) + 8HNO_3 \rightarrow$$
$$3UO_2(NO_3)_2 + 3O_2\uparrow + 2NO\uparrow + 22.6H_2O$$

This released an additional 80 grams of water to the system bringing the total free water to 2800 grams.

To effect the above reaction and permit growth of $UO_3$ hydrate crystals the mixture was digested in an autoclave for 13 hours at 265° C. The mixture was then cooled to room temperature and removed from the autoclave. The mother liquor was then poured off and the crystals washed free of uranyl nitrate with water. The washed crystals were placed in a furnace in a hydrogen atmosphere and the temperature of the furnace was slowly increased to 1750° C. It took two days for the furnace to attain that temperature and the temperature was maintained for two hours. The furnace was reduced to room temperature over a period of two days. The cooled crystals of $UO_2$ were then removed from the furnace. The sieve analysis of the crystals was as follows:

| Size (microns) | Weight (grams) | Percent of Total |
|---|---|---|
| +589 | 103 | 8.9 |
| +295 to −589 | 95 | 8.2 |
| +145 to −295 | 260 | 22.4 |
| +104 to −145 | 147 | 12.7 |
| +61 to −104 | 261 | 22.5 |
| +43 to −61 | 194 | 16.7 |
| −43 | 99 | 8.5 |
| Total | 1,159 | 99.9 |

The weight of useable crystals, 43 to 589 microns, was 957 grams or 82.57% of the total weight of the product.

In the above examples the furnace used was a high temperature controlled-atmosphere type furnace and its cycle was four days. Equally good product has been obtained with a furnace reaching temperature in four hours.

The examples given above are merely illustrative. The scope of this invention should be understood to be limited only as indicated by the appended claims.

Having thus described our invention, we claim:

1. A method for the preparation of $UO_2$ particles within the size range of approximately 40–100 microns which comprises contacting $UO_3$ with an aqueous solution of uranyl ions at an elevated temperature, separating the resulting $UO_3$ hydrate crystals from the remaining aqueous solution, washing the separated crystals with water, reducing the washed crystals to $UO_2$, heating the resulting $UO_2$ to at least approximately 1000° C. for a sufficient period of time to effect densification, and recovering the resulting densified $UO_2$ within the 40–100 micron size range.

2. A method for the preparation of $UO_2$ particles within the size range of approximately 40–100 microns which comprises contacting $UO_3$ with an aqueous solution containing uranyl ions together with ions selected from the group consisting of nitrate and acetate ions at a temperature of approximately 250 to 350° C., separating the resulting $UO_3$ hydrate crystals from the remaining aqueous solution, washing the separated crystals with water, reducing the washed crystals to $UO_2$, heating the resulting $UO_2$ to at least approximately 1000° C. for a sufficient period of time to effect densification and recovering the resulting densified $UO_2$ within the 40–100 micron size range.

3. A method for the preparation of $UO_2$ particles within the size range of approximately 40–100 microns which comprises contacting $UO_3$ with an aqueous solution containing uranyl ions together with ions selected from the group consisting of nitrate and acetate ions at a temperature of approximately 250° C. to 350° C. for approximately 5 to 20 hours, separating the resulting $UO_3$ hydrate crystals from the remaining aqueous solution, washing the separated crystals with water, reducing the washed crystals to $UO_2$, heating the resulting $UO_2$ to at least approximately 1000° C. for a sufficient period of time to effect densification and recovering the resulting densified $UO_2$ within the 40–100 micron size range.

4. The process of claim 3 wherein the washed crystals are reduced with gaseous hydrogen at a temperature of approximately 500° C. to 600° C.

5. A method for the preparation of $UO_2$ particles within the size range of approximately 40–100 microns which comprises contacting $UO_4$ hydrate with an aqueous solution containing uranyl ions together with nitrate ions, said solution containing approximately 0.9 to 20 percent uranium by weight and the uranium in said uranyl compound representing approximately 0.2 to 10 percent of the total uranium weight, autoclaving the resulting mixture at a temperature of approximately 265° C. for approximately 10 hours, separating the resulting $UO_3$ hydrate crystals from the remaining aqueous solution, cooling the separated crystals, washing the cooled crystals, slowly heating the washed crystals in a hydrogen atmosphere to a temperature of approximately 600° C., raising the temperature of the reduced crystals to approximately 1800° C., maintaining said temperature for approximately 2 hours and recovering the resulting $UO_2$ particles within the 40–100 micron size range.

References Cited in the file of this patent

Nuclear Science Abstracts, 1949 Abs. No. 1315; 1951 Abs. No. 6218.

Katz et al.; "The Chemistry of Uranium," McGraw-Hill Book Co., Inc., N.Y. (1951), pages 283, 284, 304–306, 312–314.

Kitzes et al.: "Proceedings of the International Conference on the Peaceful Uses of Atomic Energy," August 8–20, 1955, vol. 9, pp. 414–416.

Belle et al.: "WAPD–PWR–PMM–466," June 5, 1956 (date declass. March 12, 1957), pp. 5–12.

Vaughan et al.: "Reactivity Studies of Uranium Oxides," BMI–1205, July 9, 1957, pp. 1, 2, 6.